United States Patent
Song et al.

(10) Patent No.: US 9,636,946 B2
(45) Date of Patent: May 2, 2017

(54) STRUCTURE AND METHOD FOR COUPLING WHEEL BEARINGS

(75) Inventors: Jae Myeong Song, Osan-si (KR); Hee Jae Yoon, Seongnam-si (KR); Sangji Bang, Seoul (KR)

(73) Assignee: IL JIN GLOBAL CO., LTD, Seoul (KR)

( * ) Notice: Subject to any disclaimer, the term of this patent is extended or adjusted under 35 U.S.C. 154(b) by 198 days.

(21) Appl. No.: 14/388,417

(22) PCT Filed: Apr. 6, 2012

(86) PCT No.: PCT/KR2012/002621
§ 371 (c)(1),
(2), (4) Date: Sep. 26, 2014

(87) PCT Pub. No.: WO2013/151195
PCT Pub. Date: Oct. 10, 2013

(65) Prior Publication Data
US 2015/0054334 A1 Feb. 26, 2015

(51) Int. Cl.
*B60B 27/00* (2006.01)
*F16C 43/04* (2006.01)
*B23P 15/00* (2006.01)
*F16C 19/18* (2006.01)
*F16C 33/60* (2006.01)

(52) U.S. Cl.
CPC ........ *B60B 27/0078* (2013.01); *B23P 15/003* (2013.01); *B60B 27/0021* (2013.01); *B60B 27/0036* (2013.01); *B60B 27/0042* (2013.01); *F16C 19/187* (2013.01); *F16C 43/04* (2013.01); *B60B 27/0005* (2013.01); *B60B 2320/10* (2013.01); *F16C 33/60* (2013.01); *F16C 2226/12* (2013.01); *F16C 2226/52* (2013.01); *F16C 2226/60* (2013.01);
(Continued)

(58) Field of Classification Search
CPC ........... B60B 27/0078; B60B 27/0021; B60B 27/0036; B60B 27/0042; F16C 19/187; F16C 43/04; F16C 2226/12; B23P 15/003
USPC ............... 301/105.1; 384/544, 448, 589, 569
See application file for complete search history.

(56) References Cited

U.S. PATENT DOCUMENTS

| | | | |
|---|---|---|---|
| 6,955,475 B2* | 10/2005 | Tajima | B60B 27/00 384/544 |
| 8,066,337 B2* | 11/2011 | Tsuzaki | B60B 27/0005 301/105.1 |
| 2011/0194797 A1* | 8/2011 | Yamamoto | B60B 27/00 384/569 |

FOREIGN PATENT DOCUMENTS

| | | |
|---|---|---|
| CN | 1453154 | 11/2003 |
| CN | 102026824 | 4/2011 |

(Continued)

*Primary Examiner* — S. Joseph Morano
*Assistant Examiner* — Jean Charleston
(74) *Attorney, Agent, or Firm* — Lex IP Meister, PLLC

(57) ABSTRACT

The present invention relates to a structure and a method for coupling a wheel bearing that include a wheel hub for mounting a vehicle wheel, a hollow inner ring press-fitted into an end portion of the wheel hub, an annular outer ring disposed at a radial exterior of the wheel hub and the inner ring, and rolling elements disposed between the wheel hub or the inner ring and the outer ring, wherein the wheel hub and the inner ring are splined to each other and the inner ring and the joint member are coupled through facial spline. According to the present invention, driving torque of a constant velocity joint may be stably delivered to the wheel hub and noise may be reduced.

15 Claims, 13 Drawing Sheets

(52) U.S. Cl.
CPC ...... *F16C 2226/80* (2013.01); *F16C 2326/02* (2013.01); *Y10T 29/49689* (2015.01)

(56) References Cited

FOREIGN PATENT DOCUMENTS

| | | |
|---|---|---|
| GB | 2087039 | 5/1982 |
| JP | 2002-070882 | 3/2002 |
| JP | 2004-155411 | 6/2004 |
| JP | 3905398 | 4/2007 |
| JP | 2008-196545 | 8/2008 |
| JP | 2008-240992 | 10/2008 |
| JP | 2010-105471 | 5/2010 |
| JP | 2011-031683 | 2/2011 |
| JP | 2011-168266 | 9/2011 |
| KR | 1020110022449 | 3/2011 |

\* cited by examiner

STRUCTURE AND METHOD FOR COUPLING WHEEL BEARINGS

TECHNICAL FIELD

The present invention relates to a structure and a method for coupling a wheel bearing. More particularly, the present invention relates to a structure and a method for coupling a wheel bearing that can improve durability and quality of the wheel bearing.

BACKGROUND

A wheel bearing used at an axle of a vehicle enables a vehicle wheel to rotate smoothly without frictional loss and connects the vehicle wheel to a vehicle body.

Referring to FIG. 1, a cross-sectional view of a conventional wheel bearing and a constant velocity joint assembled with each other is shown in FIG. 1.

As shown in FIG. 1, the conventional wheel bearing includes a wheel hub 4, an inner ring 3 press-fitted onto the wheel hub 4, an outer ring 5 disposed at a radial exterior of the inner ring 3, and rolling elements 2 provided between the inner ring 3 and the outer ring 5. In addition, a shaft of the constant velocity joint (CVJ) 6 is splined to an interior circumference of the wheel hub 4.

As shown in FIG. 1, disengagement of the constant velocity joint 6 in an axial direction is prevented by splining the shaft of the constant velocity joint 6 into the interior circumference of the wheel hub 4 and engaging a nut to an end 7 of the shaft in the wheel bearing.

According to the conventional art, as shown in FIG. 1, preload applied to the wheel bearing is maintained by plastically deforming an end of the wheel hub 4 through orbital forming process after the inner ring 3 is press-fitted onto an end portion of the wheel hub 4.

The preload means load applied to the wheel bearing in the axial direction through the wheel hub, the rolling elements, the outer ring and the inner ring. Life of the wheel bearing is greatly affected by the suitable preload.

If plastic deformation occurs through the orbital forming process, however, deformation of the inner ring 3 may also occur due to high load and distribution of a gap and quality may be enlarged.

In addition, clearance exists between a spline formed on an interior circumference of the wheel hub 4 and a spline 1 formed on an exterior circumference of the shaft when the wheel hub 4 and the shaft of the constant velocity joint 6 are splined to each other according to the conventional art. If load generated when the vehicle runs is applied to the wheel hub 4, the clearance becomes large and noise may occur.

In addition, since driving torque is transmitted only through spline coupling of the wheel hub 4 and the shaft of the constant velocity joint 6 according to the conventional art, it is hard to transmit the driving torque stably and great load is applied to the splines 1. Therefore, the clearance enlarges at engaging portion of the splines 1, durability may be deteriorated, and life is shortened.

DETAILED DESCRIPTION

Technical Problem

The present invention has been made in an effort to provide a structure and a method for coupling a wheel bearing having advantages of solving problems such that power is transferred unstably, noise occurs, durability is deteriorated, and life is shortened due to coupling structure of a wheel hub and a constant velocity joint.

Technical Solution

To achieve above-mentioned objects, an exemplary embodiment of the present invention provides a structure for coupling a wheel bearing. In some exemplary embodiments, the structure for coupling a wheel bearing may include: a wheel hub formed of a flange for mounting a vehicle wheel; a hollow inner ring press-fitted onto an end portion of the wheel hub; an annular outer ring disposed at an outside of the wheel hub and the inner ring; at least one rolling elements disposed between the wheel hub or the inner ring and the outer ring; and a hollow pin splined to an interior circumference of the wheel hub and an interior circumference of the inner ring.

A first spline may be formed at the interior circumference of the wheel hub, a second spline may be formed at an exterior circumference of the hollow pin, and a third spline may be formed at the interior circumference of the inner ring, wherein the second spline is splined simultaneously with the first spline and the third spline.

A first facial spline may be formed radially at an end surface of the inner ring, and the structure may further include a joint member formed of a second facial spline engaged with the first facial spline; and a bolt penetrating through the hollow pin and coupling the joint member with the wheel hub.

An end of the hollow pin may be bent radially outwardly so as to form a supporting portion.

The other end of the hollow pin may be bent radially outwardly so as to form a bending portion.

The bending portion may be formed by orbital forming process.

The end portion of the wheel hub may have an interior circumference stepped radially outwardly so as to form a stepped portion, and the inner ring may be formed of a press-fitted portion protruded in an axial direction so as to be press-fitted into the stepped portion.

A diameter of an interior circumference of the stepped portion may be smaller than that of an exterior circumference of the press-fitted portion.

In another exemplary embodiment, a structure for coupling a wheel bearing may include: a wheel hub formed of a flange for mounting a vehicle wheel; a hollow inner ring penetrating through and press-fitted into an interior circumference of the wheel hub; an annular outer ring disposed at an outside of the wheel hub and the inner ring; and at least one rolling element disposed between the wheel hub or the inner ring and the outer ring, wherein a part of the inner ring penetrating through the wheel hub is splined to an interior circumference of the wheel hub.

A first facial spline may be formed radially at an end surface of the inner ring, and the structure may further include a joint member formed of a second facial spline engaged with the first facial spline; and a bolt penetrating through the hollow pin and coupling the joint member with the wheel hub.

A first spline may be formed at an interior circumference of the wheel hub, a second spline splined to the first spline may be formed at a part of the inner ring, a press-fitted portion protruded in an axial direction so as to be press-fitted into the wheel hub may be formed at other portion than the second spline of the inner ring.

A boundary portion where an exterior circumference of the inner ring and the interior circumference of the wheel hub contacts with each other may be welded such that preload applied to the wheel hub is maintained.

In addition, the present invention provides a method for coupling a wheel bearing. In some exemplary embodiments, the method for coupling a wheel bearing may include: forming a stepped portion stepped radially outwardly at an interior circumference of an end portion of a hollow wheel hub having a flange for mounting a vehicle wheel; forming a press-fitted portion at an inner ring, the press-fitted portion being protruded in an axial direction so as to be press-fitted into the stepped portion; forming a first spline at an interior circumference of the wheel hub, forming a second spline at an exterior circumference of a hollow pin inserted into the wheel hub and the inner ring, and forming a third spline at an interior circumference of the inner ring; coupling the inner ring to the wheel hub by press-fitting the press-fitted portion into the stepped portion; and inserting the hollow pin into the wheel hub and the inner ring so as for the second spline to be splined to the first spline and the third spline simultaneously.

The method for coupling a wheel bearing may further include: forming a first facial spline radially at an end surface of the inner ring and forming a second facial spline engaging with the first facial spline at a joint member; mounting the joint member to the inner ring so as to engage the first facial spline and the second facial spline; and inserting a bolt into the hollow pin and coupling the bolt to an engaging groove of the joint member.

The method for coupling a wheel bearing may include: disposing a first rolling element on an exterior circumference of the wheel hub; mounting an outer ring so as to contact with an exterior circumference of the first rolling element; and disposing a second rolling element so as to contact with an interior circumference of the outer ring.

An end of the hollow pin may be bent radially outwardly so as to form a supporting portion.

The other end of the hollow pin may be bent radially outwardly so as to form a bending portion.

A diameter of an interior circumference of the stepped portion may be smaller than that of an exterior circumference of the press-fitted portion.

In another exemplary embodiment, the method for coupling a wheel bearing may include: forming a first spline at a part of an interior circumference of a hollow wheel hub having a flange for mounting a vehicle wheel; forming an inner ring to penetrate through the wheel hub, wherein a second spline splined to the first spline is formed at a part of the inner ring; forming a press-fitted portion at other part of the inner ring, the press-fitted portion being protruded in an axial direction so as to be press-fitted into the wheel hub; and assembling the inner ring and the wheel hub by press-fitting the press-fitted portion into the wheel hub and splining the first spline with the second spline.

The method for coupling a wheel bearing may further include: forming a first facial spline radially at an end surface of the inner ring and forming a second facial spline engaging with the first facial spline at a joint member; mounting the joint member to the inner ring so as to engage the first facial spline and the second facial spline; and inserting a bolt into a hollow space of the inner ring and coupling the bolt to an engaging groove of the joint member.

The method for coupling a wheel bearing may further include: disposing a first rolling element on an exterior circumference of the wheel hub; mounting an outer ring so as to contact with an exterior circumference of the first rolling element; and disposing a second rolling element so as to contact with an interior circumference of the outer ring.

The method for coupling a wheel bearing may further include maintaining preload applied to the wheel hub by welding a boundary portion where an exterior circumference of the inner ring and the interior circumference of the wheel hub contacts with each other in a state that the wheel hub is pressed to the inner ring.

Advantageous Effect

Since a joint member such as a constant velocity joint is coupled to an inner ring by facial spline and the inner ring and the wheel hub are connected or coupled by spline, power may be transferred stably and durability may improve according to a structure and a method for coupling a wheel bearing of the present invention.

In addition, since the inner ring is press-fitted into the wheel hub and preload is maintained by welding, preload may be applied stably and noise may be reduced by preventing occurrence of clearance according to a structure and a method for coupling a wheel bearing of the present invention.

In addition, since the wheel hub and the joint member are engaged by using the bolt, assembling or disassembling may be easy, maintainability may improve, and weight of the wheel bearing may be lowered by reducing the number of components according to a structure and a method for coupling a wheel bearing of the present invention.

DESCRIPTION OF SYMBOLS

Figure 1:
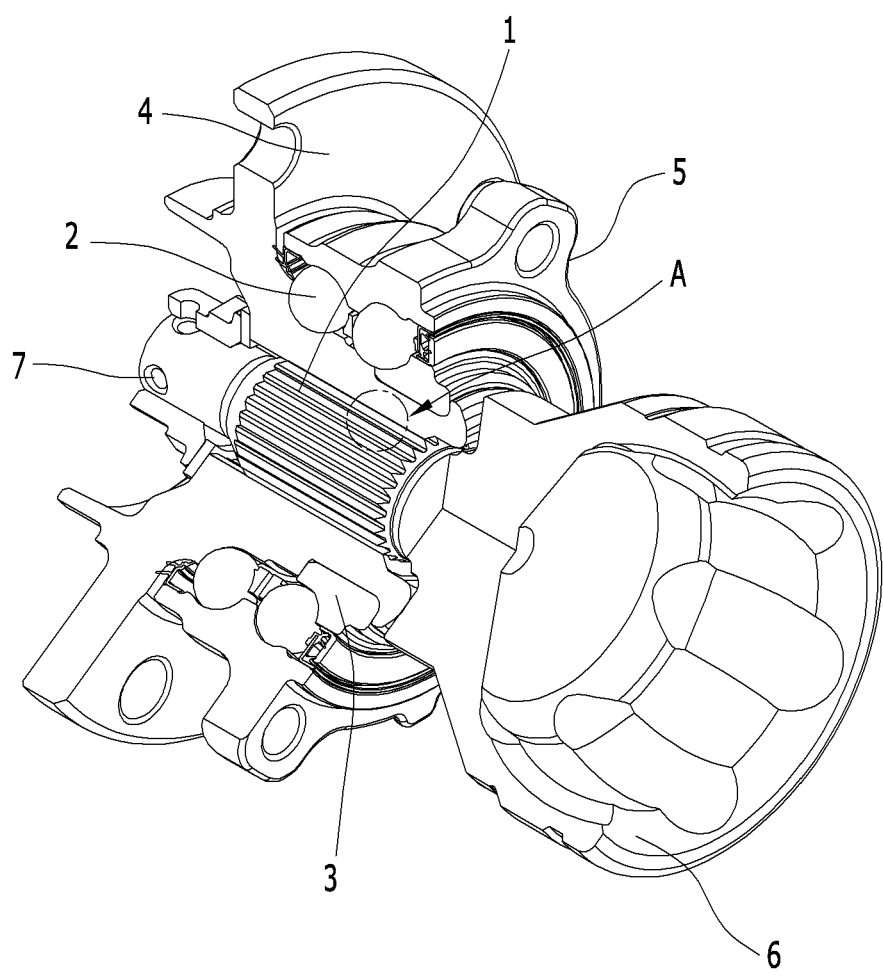
FIG. 1 is a perspective view of a conventional wheel bearing.

| | |
|---|---|
| 100: wheel hub | 110: first spline |
| 120: hub bolt | 130: stepped portion |
| 200: inner ring | 210: third spline |
| 220: first facial spline | 230: second spline |
| 240: press-fitted portion | 300: outer ring |
| 400: rolling element | 500: hollow pin |
| 510: second spline | 520: supporting portion |
| 530: bending portion | 600: joint member |
| 610: second facial spline | 620: engaging groove |
| 700: bolt | |

BEST MODE FOR EXECUTING THE INVENTION

Exemplary embodiments of the present invention will hereinafter be described in detail with reference to the accompanying drawings.

FIG. 2 to FIG. 6 show a structure for coupling a wheel bearing according to the first exemplary embodiment of the present invention.

As shown in FIG. 2 to FIG. 6, a structure for coupling a wheel bearing according to the first exemplary embodiment of the present invention includes a wheel hub 100, an inner ring 200, an outer ring 300, rolling elements 400, a hollow pin 500, a joint member 600, and a bolt 700.

Figure 2:
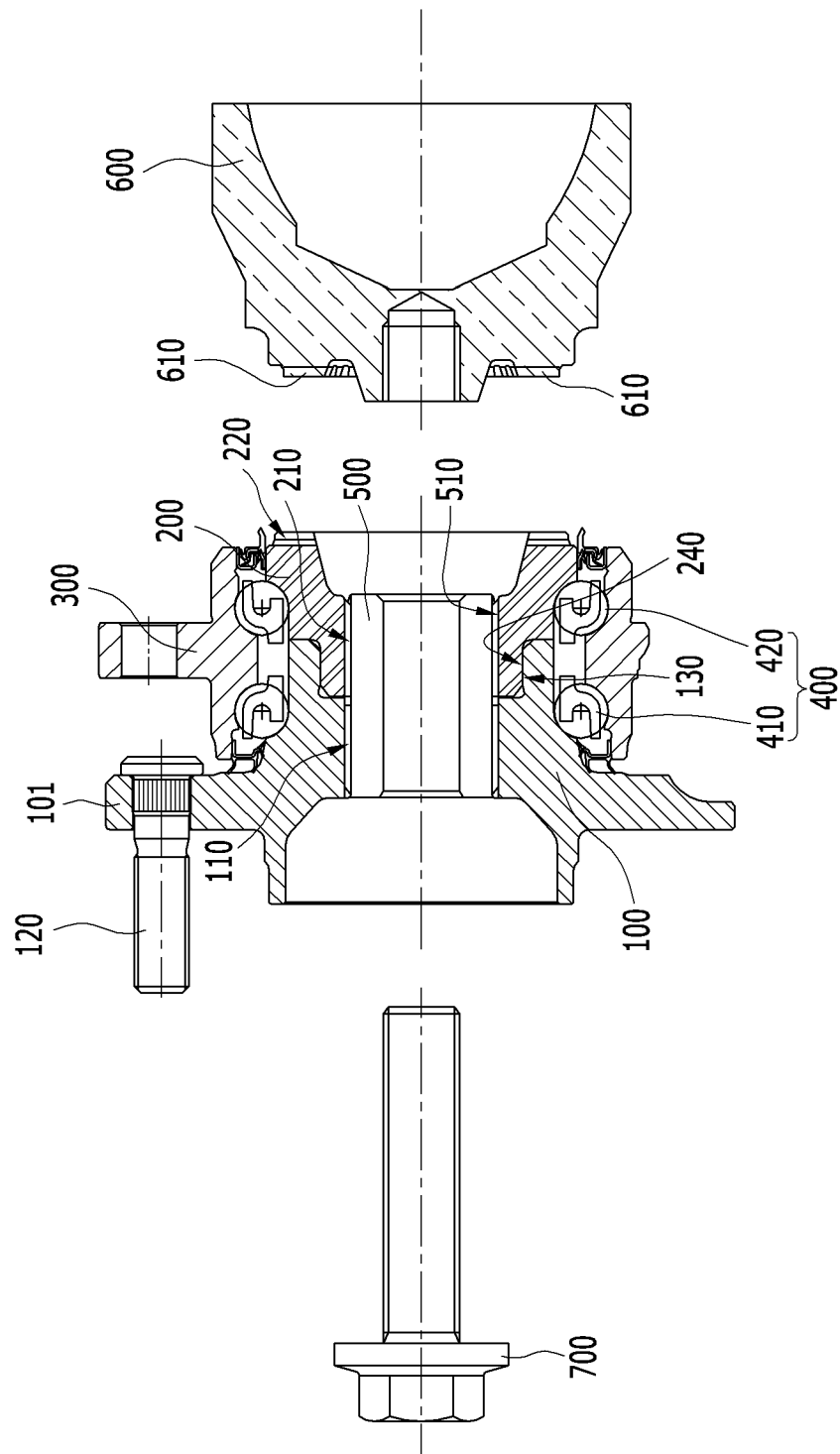
FIG. 2 is a cross-sectional view of a structure for coupling a wheel bearing according to the first exemplary embodiment of the present invention.

The wheel hub 100 transfers driving torque of the joint member 600 such as a constant velocity joint (CVJ) to a vehicle wheel. The wheel hub 100 is provided with a flange 101 and a hub bolt 120 for mounting the vehicle wheel. The flange 101, as shown in FIG. 2, is protruded radially outwardly from the wheel hub 100 and generally has a disk shape. A plurality of bolt holes into which the hub bolts 120 are press-fitted is formed at the flange 101. The vehicle wheel is mounted through the plurality of hub bolts 120 press-fitted into the flange 101 so as to be connected to wheel hub 100.

The wheel hub 100 has an annular shape and a first spline 110 is formed on an interior circumference of the wheel hub. The first spline 110 has a shape corresponding to that of a second spline 510 formed on an exterior circumference of the hollow pin 500.

Figure 4:
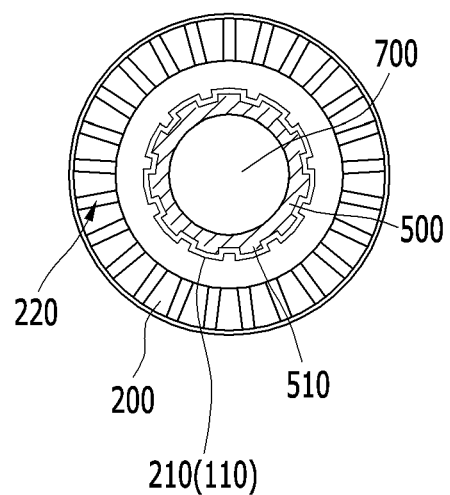
FIG. 4 is a cross-sectional view of an end of an inner ring in FIG. 3 viewing it in A direction.

In one or more exemplary embodiments, the first spline 110, as shown in FIG. 4, is formed by a plurality of protrusions and depressions continuously formed on the interior circumference of the wheel hub 100 circumferentially. The first spline 110 and the second spline 510 of the hollow pin 500 are splined to each other so as to transfer the driving torque of the joint member 600 to the vehicle wheel.

The inner ring 200 is press-fitted into an interior circumference of an end portion of the wheel hub 100. The inner ring 200 has an annular shape similar to the wheel hub 100, and a diameter of an interior circumference of the inner ring 200 is the same as that of the interior circumference of the wheel hub 100.

The stepped portion 130 that is stepped radially outwardly is formed at the interior circumference of the end portion of the wheel hub 100 as shown in FIG. 2, and a press-fitted portion 240 corresponding to the stepped portion 130 is protruded in an axial direction from the inner ring 200. The press-fitted portion 240 is press-fitted into an interior circumference of the stepped portion 130 such that the inner ring 200 is firstly assembled to the wheel hub 100.

In order to press-fit the inner ring 200 into the wheel hub 100, a diameter of the interior circumference of the stepped portion 130 is formed smaller than that of an exterior circumference of the press-fitted portion 240 a little and the inner ring 200 is press-fitted into the wheel hub 100 by a hydraulic press.

In one or more exemplary embodiments, a raised spot (not shown) may be formed at the interior circumference of the stepped portion 130 of the wheel hub 100 and a protrusion (not shown) caught by the raised spot may be formed at an exterior circumference of the press-fitted portion 240 of the inner ring 200. After that, the inner ring 200 may be press-fitted into the wheel hub 100.

Figure 3:
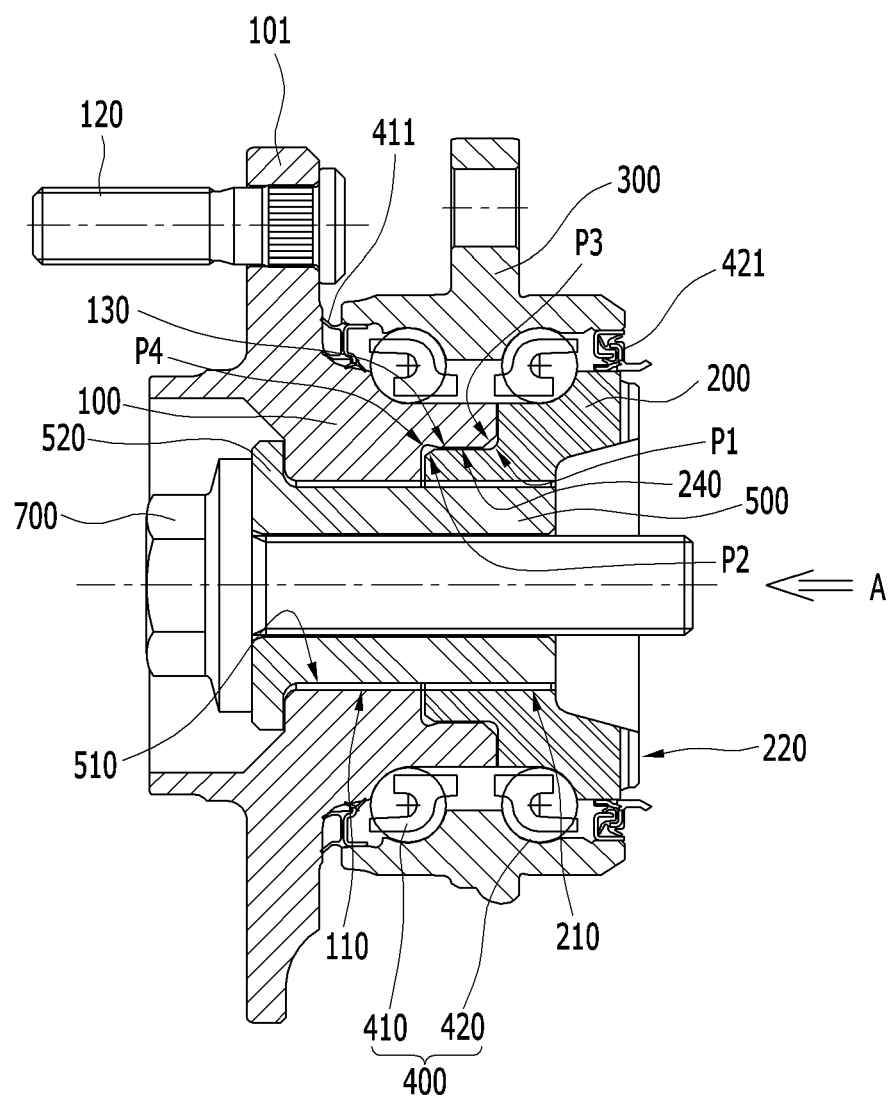
FIG. 3 is a cross-sectional view of a structure for coupling a wheel bearing where a hollow pin in FIG. 2 is changed a little.

In addition, when the press-fitted portion 240 of the inner ring 200 is press-fitted into the stepped portion 130 of the wheel hub 100, the stepped portion 130, the press-fitted portion 240, and edges of the stepped portion 130 and the press-fitted portion 240 may be worn out and durability thereof may be deteriorated. Therefore, as shown in FIG. 3, edges P1 and P2 of the press-fitted portion 240 of the inner ring 200 may be formed in a curved shape. In the same way, edges P3 and P4 of the interior circumference of the stepped portion 130 in the wheel hub 100 may be formed in a curved shape. Deterioration of durability due to abrasion between the stepped portion 130 and the press-fitted portion 240 during press-fitting may be prevented by forming the edges P1 and P2 of the press-fitted portion 240 and the edges P3 and P4 of the interior circumference of the stepped portion 130 in the curved shapes.

A third spline 210 to which the second spline 510 of the hollow pin 500 is splined is formed at the interior circumference of the inner ring 200 similar to the wheel hub 100.

As shown in FIG. 3 to FIG. 4, a first facial spline 220 is formed radially at an end surface of the inner ring 200.

In addition, a second facial spline 610 engaging with the first facial spline 220 of the inner ring 200 is formed at a surface of the joint member 600 contacting with the end surface of the inner ring 200. Since power delivery from the joint member 600 to the inner ring 200 is assisted by the first facial spline 220 and the second facial spline 610 engaging with each other, stable power delivery may be achieved and noise may be reduced in power delivery.

As shown in FIG. 2 to FIG. 3, the annular outer ring 300 is disposed at a radial exterior of the inner ring 200 and at least one rolling element 400 is disposed between the wheel hub 100 or the inner ring 200 and the outer ring 300.

In one or more exemplary embodiments, as shown in FIG. 3, the rolling elements 400 may include a first rolling element 410 and a second rolling element 420. The first rolling element 410 is disposed between an interior circumference of an end portion of the outer ring 300 and the exterior circumference of the wheel hub 100, and the second rolling element 420 is disposed between an interior circumference of the other end portion of the outer ring 300 and the exterior circumference of the inner ring 200. The first rolling element 410 and the second rolling element 420 slidingly contact to the wheel hub 100 or the inner ring 200 and the outer ring 300 so as to smoothen relative rotation of the wheel hub 100 or the inner ring 200 and the outer ring 300.

In addition, a first sealing member 411 may be mounted between the exterior circumference of the wheel hub 100 adjacent to the flange 101 and the interior circumference of the end portion of the outer ring 300. The first sealing member 411 generally has a ring shape, prevents foreign material such as dust and moisture from entering a space between the wheel hub 100 and the outer ring 300, and prevents lubrication for smoothening sliding of the first rolling element 410 from being leaked from the space between the outer ring 300 and the wheel hub 100.

In the same way, a second sealing member 421 may be mounted between the exterior circumference of the end portion of the inner ring 200 and the interior circumference of the other end portion of the outer ring 300. The second sealing member 421 generally has a ring shape, prevents foreign material such as dust and moisture from entering a space between the inner ring 200 and the outer ring 300, and prevents lubrication for smoothening sliding of the second rolling element 420 form being leaked from the space between the inner ring 200 and the outer ring 300.

The hollow pin 500 is splined simultaneously to the interior circumference of the wheel hub 100 and the interior circumference of the inner ring 200 such that the driving torque delivered from the joint member 600 to the inner ring 200 is delivered to the wheel hub 100. For this purpose, a second spline 510 corresponding to the first spline 110 of the wheel hub 100 and the third spline 210 of the inner ring 200 is formed at an exterior circumference of the hollow pin 500.

As shown in FIG. 3, a supporting portion 520 extending radially outwardly is formed an end of the hollow pin 500.

In one or more exemplary embodiments, an end surface of the supporting portion 520 is flat so as to be operated as a bolt seat stably supporting a bolt 700 by contacting with a head of the bolt 700 when coupling with the bolt 700.

Figure 5:
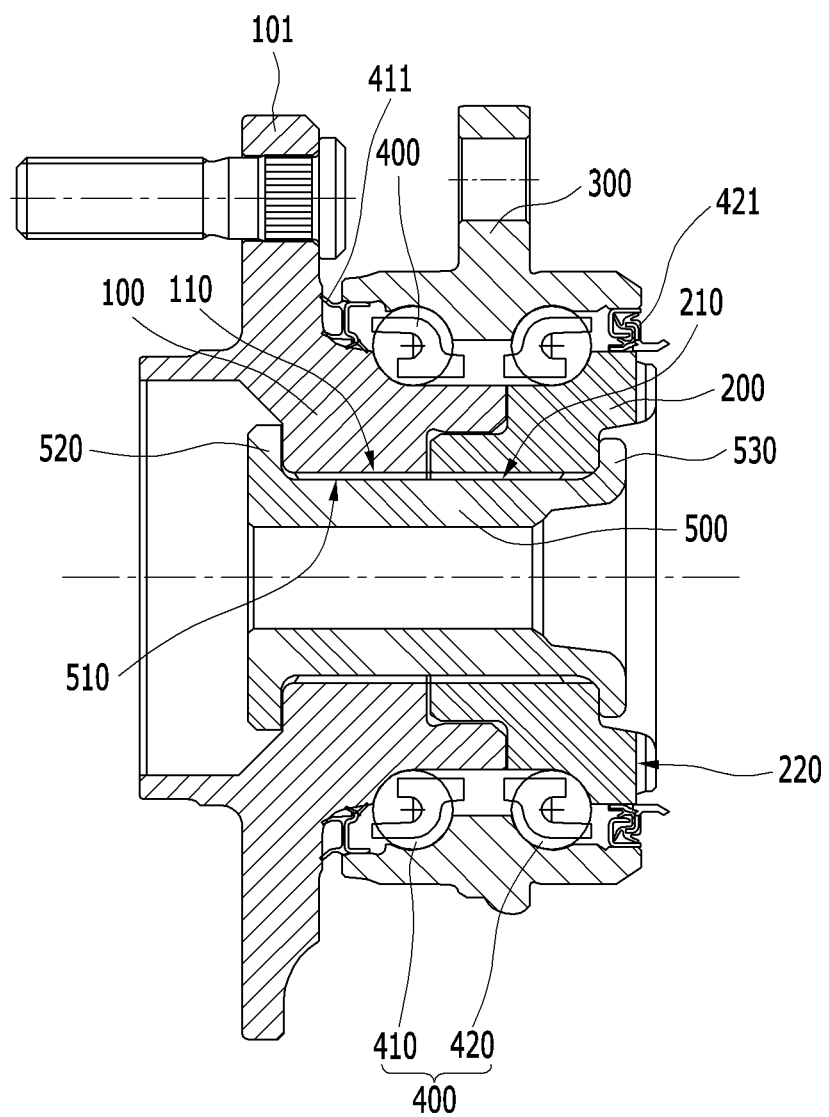
FIG. 5 is a cross-sectional view of a structure for coupling a wheel bearing where a hollow pin in FIG. 2 is changed a little.

In addition, as shown in FIG. 5, the supporting portion 520 extending radially outwardly toward the wheel hub 100 may be formed at the end of the hollow pin 500 and a bending portion 530 bent radially outwardly toward the inner ring 200 may be formed at the other end of the hollow pin 500.

The bending portion 530 is formed by orbital forming process or swaging process so as to maintain preload applied to the wheel bearing stably.

Figure 6:
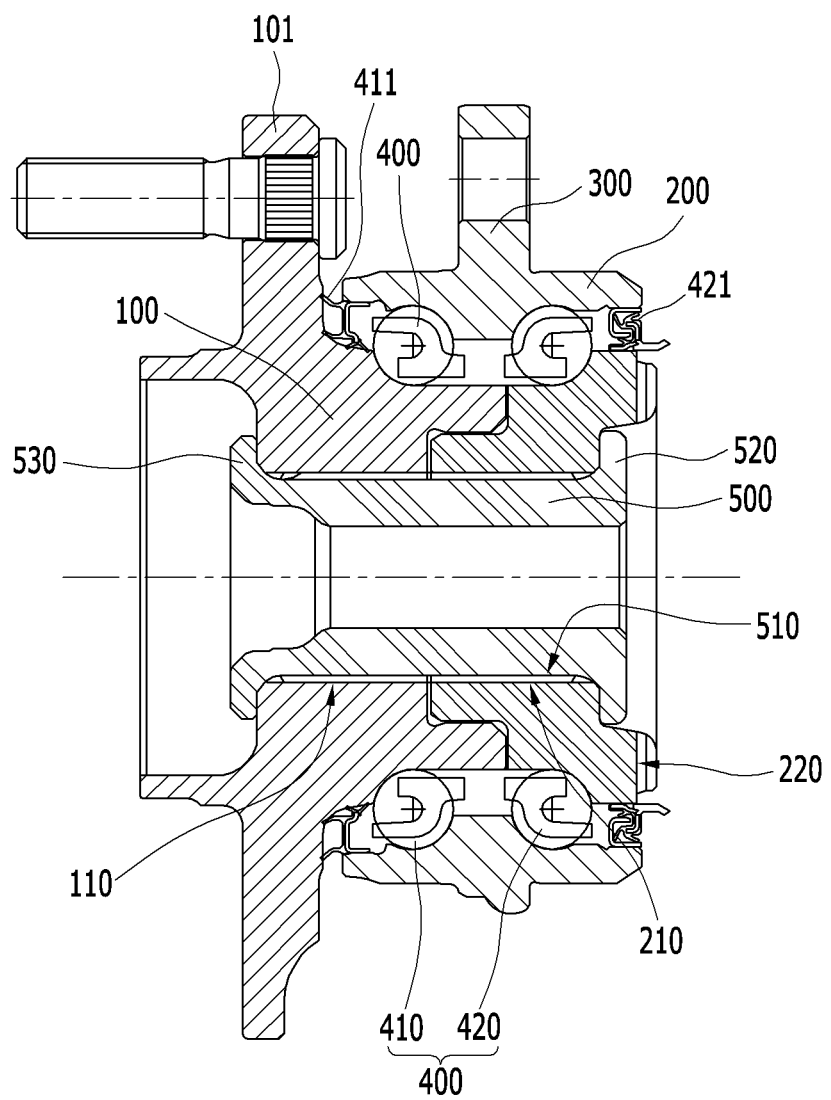
FIG. 6 is a cross-sectional view of a structure for coupling a wheel bearing where a hollow pin in FIG. 2 is changed a little.

In one or more exemplary embodiments, as shown in FIG. 6, the supporting portion 520 may be formed at the other end of the hollow pin 500 close to the inner ring 200 and the bending portion 530 may be formed at the end of the hollow pin 500 close to the wheel hub 100. In a state that the supporting portion 520 of the hollow pin 500 is formed prior to the bending portion 530 and the supporting portion 520 is supported by the inner ring 200, the bending portion 530 is formed by orbital forming process or swaging process. Therefore, the preload applied to the wheel bearing may be stably maintained.

Figure 7:
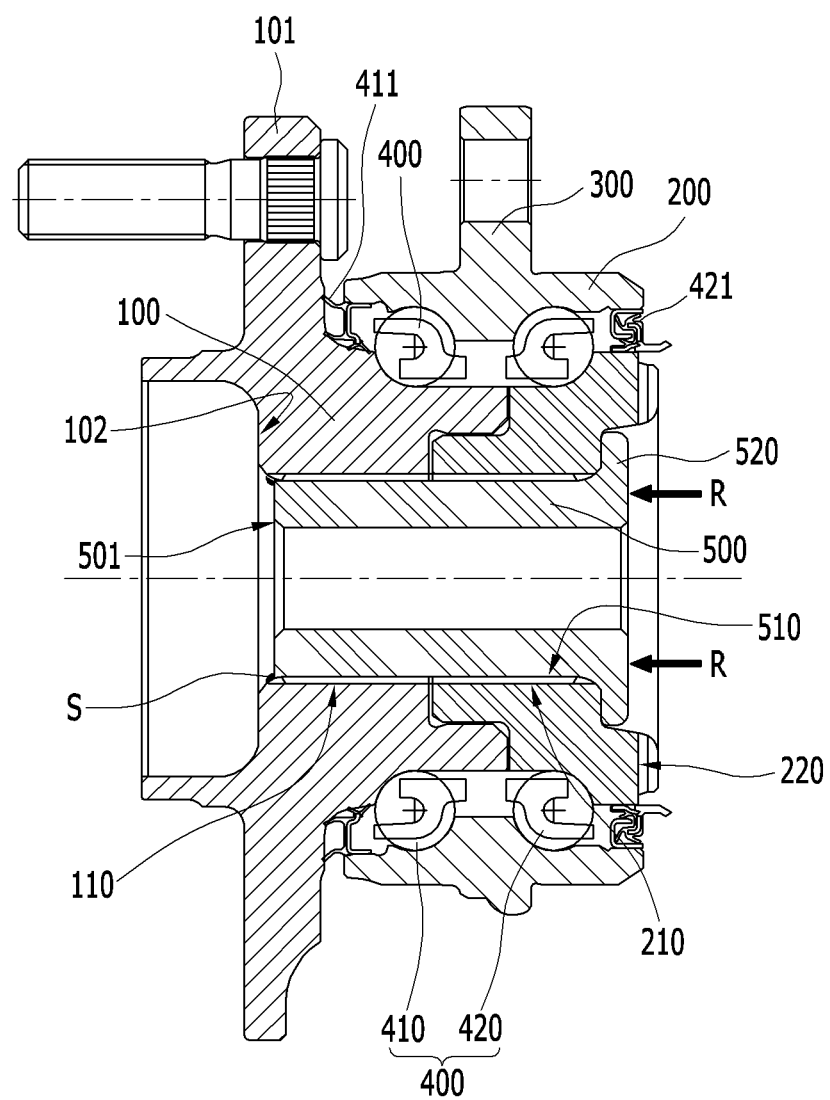
FIG. 7 is a cross-sectional view of a structure for coupling a wheel bearing where the hollow pin and the wheel hub are welded.

In one or more exemplary embodiments, as shown in FIG. 7, the supporting portion 520 of the hollow pin 500 is extended radially outwardly toward the inner ring 200 and the hollow pin is inserted into the inner ring 200. At this time, an end portion 501 of the completely inserted hollow pin 500 close to the wheel hub 100 is positioned interior to an end portion 102 of wheel hub 100. In addition, in a state that the supporting portion 520 of the hollow pin 500 is pressed in R direction, the end portion 501 of the hollow pin 500 is welded along a portion S contacting with the interior circumference of the wheel bearing. Thereby, the preload applied to the wheel bearing can be stably maintained by using the hollow pin 500. If welded, welding portion S is not exposed to the exterior of the end portion 102 of the wheel hub and is positioned in the interior circumference of the wheel hub 100. Therefore, engagement of the bolt 700 is not affected by the welding portion S.

The joint member 600 is mounted at a driving axle connected to a final reduction device in a front-wheel drive vehicle so as to deliver power to the vehicle wheel, and may be a constant velocity joint (CVJ) which delivers power with constant speed.

The second facial spline 610 engaging with the first facial spline 220 of the inner ring 200 is formed at the end surface of the joint member 600. Since power delivery from the joint member 600 to the inner ring 200 is assisted by the first facial spline 220 and the second facial spline 610 engaging with each other, stable power delivery may be achieved.

The bolt 700 penetrates through the hollow pin 500 form a side of the wheel hub 100 and couples with the joint member 600. For this purpose, an engaging groove 620 into which the bolt 700 is inserted is formed at a center portion of the joint member 600.

Figure 12:
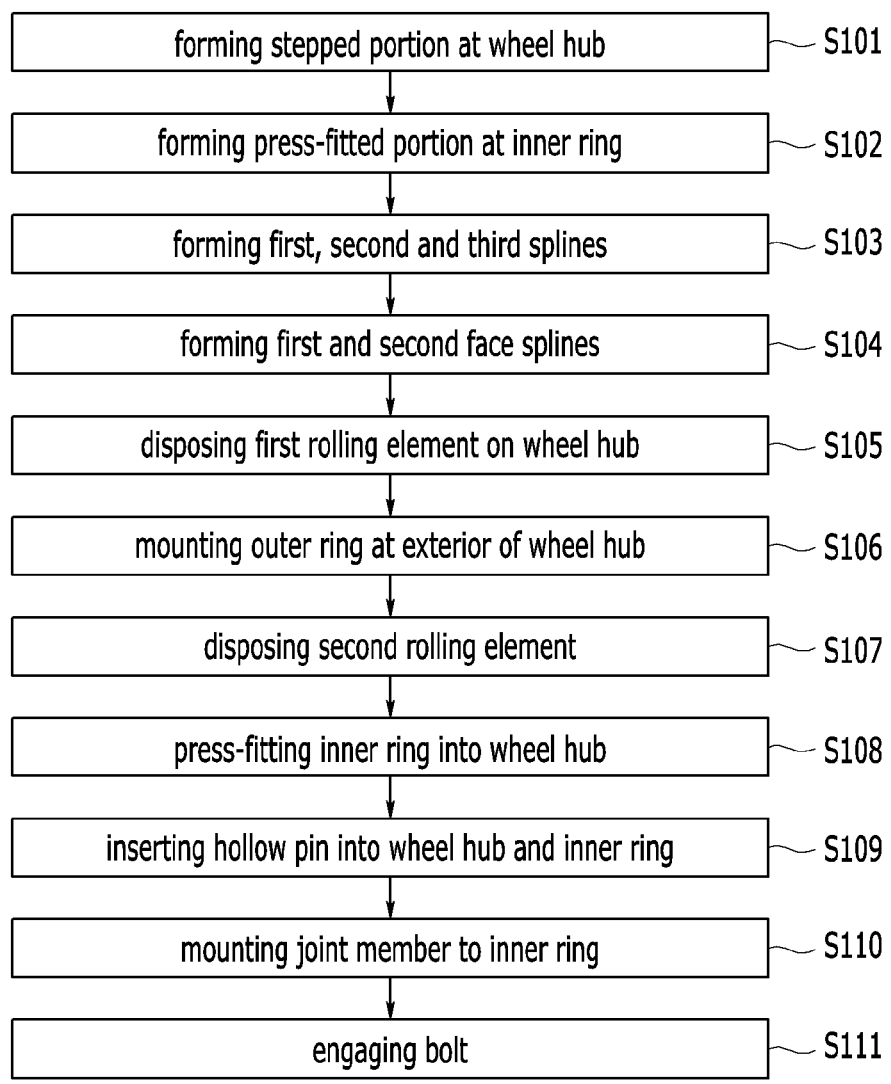
FIG. 12 is a flowchart of a method for coupling a wheel bearing according to the first exemplary embodiment of the present invention.

FIG. 12 is a flowchart of a method for coupling a wheel bearing according to the first exemplary embodiment of the present invention.

Referring to FIG. 2 to FIG. 6 and FIG. 12, a method for coupling a wheel bearing according to the first exemplary embodiment of the present invention will hereinafter be described. Steps shown in FIG. 12 are for better comprehension and ease of description and scope of the present invention is not limited to the sequence of the steps shown in FIG. 12.

The stepped portion 130 stepped radially outwardly is formed at the wheel hub 100 at step S101. The flange 101 for mounting the vehicle wheel is formed at the wheel hub 100 and is coupled to the hub bolt 120. As shown in FIG. 2, the stepped portion 130 stepped radially outwardly is formed at the interior circumference of the end portion of the wheel hub.

The press-fitted portion 240 protruded in the axial direction and press-fitted into the stepped portion 130 of the wheel hub 100 is formed at the inner ring 200 at step S102.

After that, the first spline 110 is formed at the interior circumference of the wheel hub 100, the second spline 510 is formed at the exterior circumference of the hollow pin 500 inserted into the wheel hub 100 and the inner ring 200, and the third spline 210 is formed at the interior circumference of the inner ring 300 at step S103.

As shown in FIG. 4, the first spline 110 may be formed by continuously forming the plurality of protrusions and depressions at the interior circumference of the wheel hub 100 circumferentially, the second spline 510 may be formed by continuously forming the plurality of protrusions and depressions at the exterior circumference of the hollow pin 500 circumferentially, and the third spline 210 is formed by continuously forming the plurality of protrusions and depressions at the interior circumference of the inner ring 200.

Since the second spline 510 of the hollow pin 500 is simultaneously splined to the first and third splines 110 and 210, the driving torque of the joint member 600 received from the inner ring 200 is delivered stably to the wheel hub 100.

In one or more exemplary embodiments, the first spline 110 of the wheel hub 100 and the third spline 210 of the inner ring 200 may be formed through separate processes or through the same process after the wheel hub 100 and the inner ring 200 are aligned.

As shown in FIG. 3 and FIG. 4, the first facial spline 220 is formed radially at the end surface of the inner ring 200 and the second facial spline 610 engaging with the first facial spline 220 is formed at the joint member 600 at step S104.

After that, the first rolling element 410 is disposed between the exterior circumference of the end portion of the wheel hub 100 at step S105.

As shown in FIG. 3, the first rolling element 410 is mounted between the exterior circumference of the wheel hub 100 and the interior circumference of the end portion of the outer ring 300 so as to smoothen relative rotation of the wheel hub 100 and the outer ring 300. In addition, the first sealing member 411 may be disposed at the exterior circumference of the wheel hub 100 before the first rolling element 410 is disposed. The first sealing member 411 may be a ring-shaped seal. The first sealing member 411 generally has a ring shape, prevents foreign material such as dust and moisture from entering the space between the wheel hub 100 and the outer ring 300, and prevents lubrication for smoothening sliding of the first rolling element 410 from being leaked from the space between the outer ring 300 and the wheel hub 100.

After that, as shown in FIG. 3, the outer ring 300 is mounted to contact with an exterior circumference of the first rolling element 410 at step S106.

After that, the second rolling element 420 is disposed to contact the interior circumference of the other end portion of the outer ring at step S107 in a state that the outer ring 300 is mounted.

After that, the inner ring 200 is press-fitted into the wheel hub 100 and the inner ring 200 and the wheel hub 100 are assembled firstly at step S108.

At this time, the press-fitted portion 240 of the inner ring 200 formed at the step S102 is press-fitted into the stepped portion 130 of the wheel hub 100 formed at the step S101.

In one or more exemplary embodiments, since the diameter of the interior circumference of the stepped portion 130 is smaller than that of the exterior circumference of the press-fitted portion 240 a little, the inner ring 200 may be press-fitted into the wheel hub 100 using the hydraulic press.

In one or more exemplary embodiments, the raised spot (not shown) may be formed at the interior circumference of the stepped portion 130 of the wheel hub 100 and the protrusion (not shown) caught by the raised spot may be formed at an exterior circumference of the press-fitted portion 240 of the inner ring 200. After that, the inner ring 200 may be press-fitted into the wheel hub 100.

In a state that the inner ring 200 is press-fitted, as shown in FIG. 3, the second sealing member 421 may be disposed between the exterior circumference of the inner ring 200 and the interior circumference of the other end portion of the outer ring 300. The second sealing member 421 may be a ring-shaped seal.

After that, the hollow pin 500 at which the second spline 510 corresponding to the first spline 110 of the wheel hub 100 and the third spline 210 of the inner ring 200 is formed is inserted and assembled simultaneously into the wheel hub 100 and the inner ring 200 at step S109.

Referring to FIG. 5 or FIG. 6, the end of the hollow pin 500 may be bent radially outwardly so as to form the supporting portion 520 and the other end of the hollow pin 500 may be bent radially outwardly so as to form the bending portion 530.

In one or more exemplary embodiments, the bending portion 530 is formed through orbital forming process or swaging process in a state that the hollow pin 500 is inserted into the wheel hub 100 and the inner ring 200 such that preload is maintained.

In one or more exemplary embodiments, as shown in FIG. 7, the one end of the hollow pin is formed of the supporting portion 520 bent radially outwardly toward the inner ring 200, and the other end of the hollow pin 500 is coupled to the wheel hub 100 by welding the portion S contacting with the interior circumference of the wheel hub 100 in a state that the supporting portion 520 is pressed in the R direction after the hollow pin 500 is inserted into the wheel hub 100 and the inner ring 200.

After that, the joint member 600 having the second facial spline 610 engaging with the first facial spline 220 of the inner ring 200 is mounted at the inner ring 200 at step S110.

As shown in FIG. 3 or FIG. 4, since the first facial spline 220 and the second facial spline 610 are coupled with each other, driving torque of the joint member 600 is stably delivered to the inner ring and durability may improve.

Lastly, the bolt 700 penetrates through the hollow pin 500 and is coupled to the engaging groove 620 of the joint member 600 at step S111.

Since the inner ring 200 and the joint member 600 are coupled through facial spline and the inner ring 200 and the wheel hub 100 is splined to the hollow pin 500 according to the first exemplary embodiment of the present invention, stable power delivery may be achieved and durability may improve. In addition, since the inner ring 200 is press-fitted into the end portion of the wheel hub 100, creep of the inner ring 200 may be prevented and noise may be reduced when power is delivered. Since engagement is achieved by the bolt 700, assembling or disassembling may be easy and maintainability may improve.

FIG. 8 to FIG. 11 show a structure for coupling a wheel bearing according to the second exemplary embodiment of the present invention.

As shown in FIG. 8 to FIG. 11, a structure for coupling a wheel bearing according to the second exemplary embodiment of the present invention includes a wheel hub 100, an inner ring 200, an outer ring 300, rolling elements 400, a joint member 600 and a bolt 700.

Figure 8:
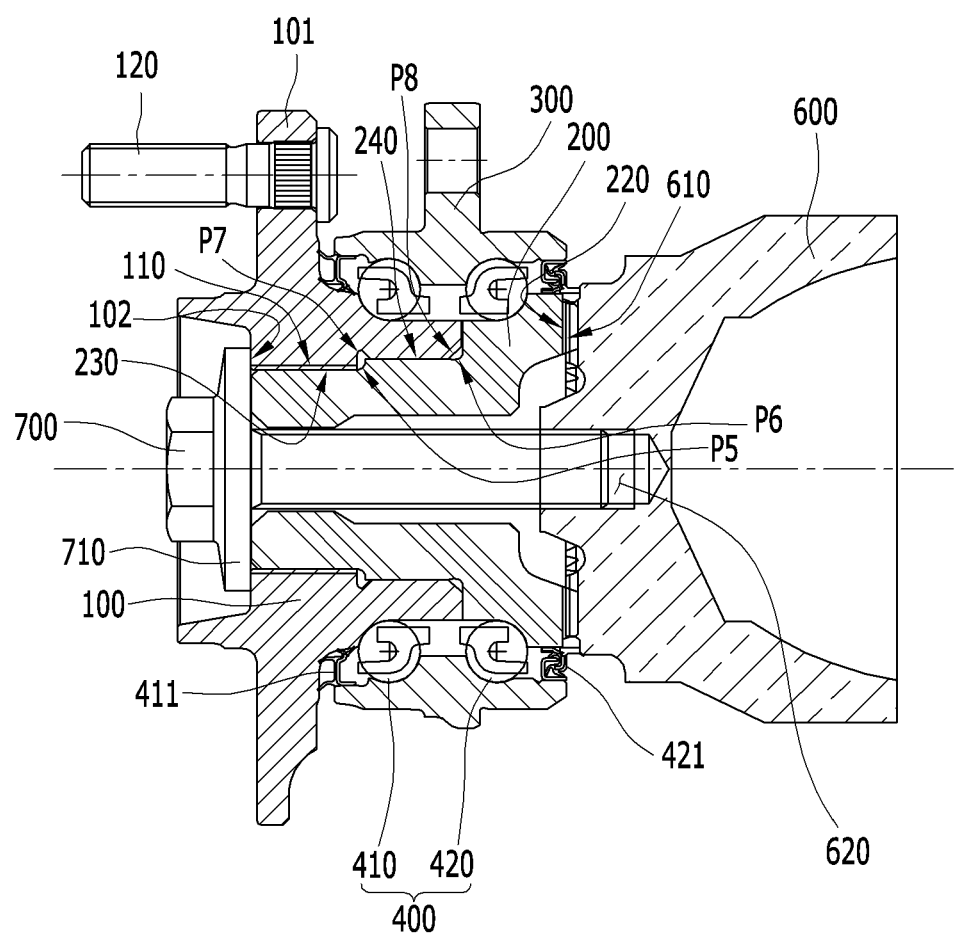
FIG. 8 is a cross-sectional view of a structure for coupling a wheel bearing according to the second exemplary embodiment of the present invention.

The wheel hub 100 transfers driving torque of the joint member 600 such as a constant velocity joint (CVJ) to a vehicle wheel. The wheel hub 100 is provided with a flange 101 and a hub bolt 120 for mounting the vehicle wheel. The flange 101, as shown in FIG. 8, is protruded radially outwardly from the wheel hub 100 and generally has a disk shape. A plurality of bolt holes into which the hub bolts 120 are press-fitted is formed at the flange 101. The vehicle wheel is mounted through the plurality of hub bolts 120 press-fitted into the flange 101 so as to be connected to wheel hub 100.

The wheel hub 100 has an annular shape and a first spline 110 is formed on a part of an interior circumference of the wheel hub.

As shown in FIG. 8, the annular outer ring 300 is disposed at a radial exterior of the inner ring 200 and at least one rolling element 400 is disposed between the wheel hub 100 or the inner ring 200 and the outer ring 300.

In one or more exemplary embodiments, as shown in FIG. 3, the rolling elements 400 may include a first rolling element 410 and a second rolling element 420. The first rolling element 410 is disposed between an interior circumference of an end portion of the outer ring 300 and the exterior circumference of the wheel hub 100, and the second rolling element 420 is disposed between an interior circumference of the other end portion of the outer ring 300 and the exterior circumference of the inner ring 200. The first rolling element 410 and the second rolling element 420 smoothens relative rotation of the wheel hub 100 or the inner ring 200 and the outer ring 300.

In addition, a first sealing member 411 may be mounted between the exterior circumference of the wheel hub 100 adjacent to the flange 101 and the interior circumference of the end portion of the outer ring 300. The first sealing member 411 generally has a ring shape, prevents foreign material such as dust and moisture from entering a space between the wheel hub 100 and the outer ring 300, and prevents lubrication for smoothening sliding of the first rolling element 410 from being leaked from the space between the outer ring 300 and the wheel hub 100.

In the same way, a second sealing member 421 may be mounted between the exterior circumference of the end portion of the inner ring 200 and the interior circumference of the other end portion of the outer ring 300. The second sealing member 421 generally has a ring shape, prevents foreign material such as dust and moisture from entering a space between the inner ring 200 and the outer ring 300, and prevents lubrication for smoothening sliding of the second rolling element 420 form being leaked from the space between the inner ring 200 and the outer ring 300.

In the second exemplary embodiment, different from the first exemplary embodiment, the inner ring 200 is not press-fitted into the end portion of the wheel hub 100 but penetrates through and is press-fitted into the interior circumference of the wheel hub 100.

Therefore, as shown in FIG. 8, a part of the inner ring penetrates a hollow space of the wheel hub 100.

A part of the inner ring 200 penetrating through the wheel hub 100 is a press-fitted portion 240 and is press-fitted into the interior circumference of the wheel hub 100, and the other part of the inner ring 200 penetrating through the wheel hub 100 other than the press-fitted portion 240 is formed of a second spline 230 so as to be splined to the first spline 110 of the wheel hub 100.

In order to press-fit the inner ring 200 into the wheel hub 100, a diameter of the interior circumference of the wheel hub 100 is smaller than a diameter of the exterior circumference of the press-fitted portion 240 a little and the inner ring 200 is press-fitted into the wheel hub 100 by a hydraulic press.

In one or more exemplary embodiments, a raised spot (not shown) may be formed at the interior circumference of the wheel hub 100 and a protrusion (not shown) caught by the raised spot may be formed at an exterior circumference of the press-fitted portion 240. After that, the inner ring 200 may be press-fitted into the wheel hub 100.

In one or more exemplary embodiments, as shown in FIG. 8, the part of the inner ring 200 penetrating through the wheel hub 100 and close to the flange 101 is formed of the second spline 230 and the other part of the inner ring 200 penetrating through the wheel hub 100 close to the outer ring 300 is formed of the press-fitted portion 240. In this case, the first spline 110 splined with the second spline 230 is formed at the interior circumference of the wheel hub 100 close to the flange 101.

Figure 9:
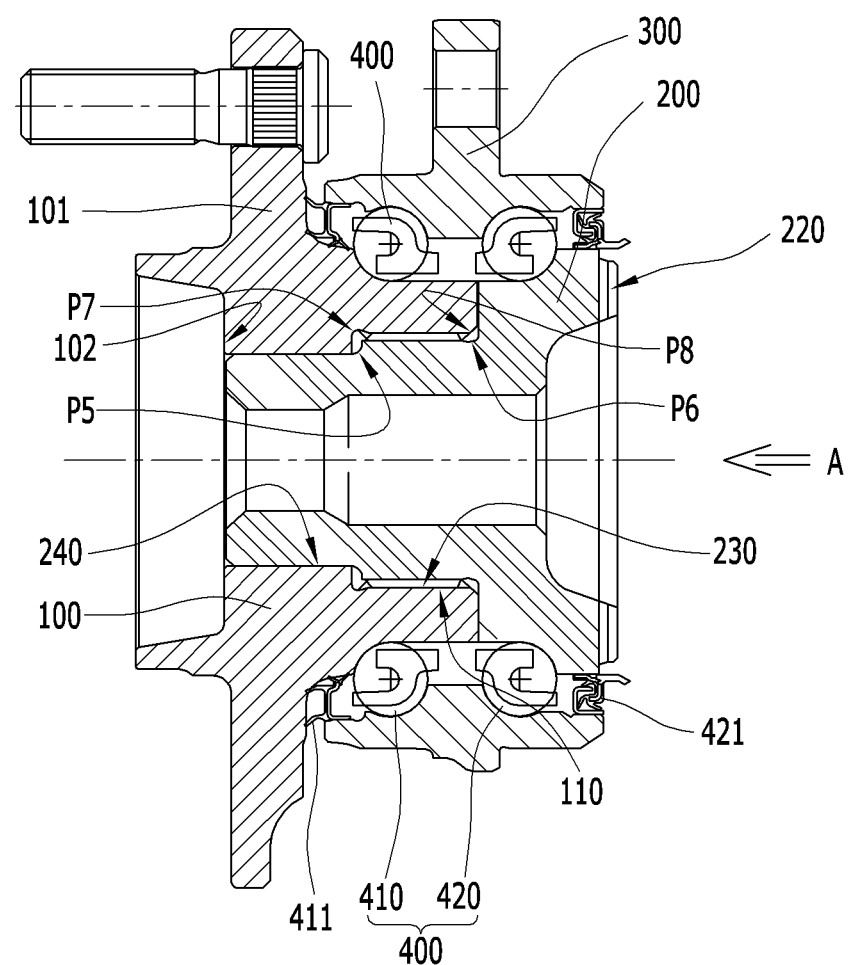
FIG. 9 is a cross-sectional view of a structure for coupling a wheel bearing where an inner ring in FIG. 8 is changed a little.

In one or more exemplary embodiments, as shown in FIG. 9, the part of the inner ring 200 penetrating through the wheel hub 100 and close to the flange 101 is formed of the press-fitted portion 240, and the other part of the inner ring 200 penetrating through the wheel hub 100 and close to the outer ring 300 is formed of the second spline 230, contrary to FIG. 8. In this case, the first spline 110 splined to the second spline 230 is formed at the interior circumference of the wheel hub 100 close to the outer ring 300.

Therefore, the hollow pin 500 is not necessary and the inner ring 200 functions as the hollow pin 500 of the first exemplary embodiment in the second exemplary embodiment, contrary to first exemplary embodiment.

As described above, the part of the inner ring 200 penetrating through the wheel hub 100 may be the press-fitted portion 240 and the other part of the inner ring 200 penetrating through the wheel hub 100 may be the second spline 230. In this case, as shown in FIG. 8 or FIG. 9, steps may be formed at the exterior circumference of the inner ring 200 and the interior circumference of the wheel hub 100 due to diameter difference between the second spline 230 and the press-fitted portion 240 of the inner ring 200. When the inner ring 200 is press-fitted into the wheel hub 100, edges P5-P8 where the inner ring 200 and the wheel hub 100 contact with each other may be rubbed due to the steps and durability may be deteriorated. Therefore, as shown in FIG. 8 to FIG. 9, the edges P5 and P6 of the exterior circumference of the press-fitted portion 240 or the second spline 230 may be formed in a curved shape. In the same way, the edges P7 and P8 of the interior circumference of the wheel hub 100 may be formed in a curved shape. Deterioration of durability due to abrasion during press-fitting may be prevented by forming the edges P5-P8 in the curved shapes.

Figure 10:
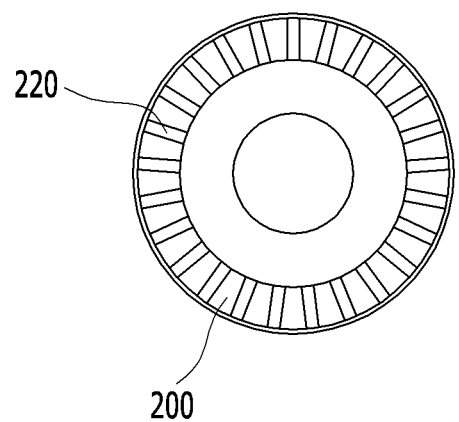
FIG. 10 is a cross-sectional view of an end of an inner ring in FIG. 9 viewing it in A direction.

As shown in FIG. 9 to FIG. 10, a first facial spline 220 is formed radially at an end surface of the inner ring 200 and a second facial spline 610 engaging with the first facial spline 220 is formed at the joint member 600. Since power delivery from the joint member 600 to the inner ring 200 is assisted by the first facial spline 220 and the second facial spline 610 engaging with each other, stable power delivery may be achieved.

In addition, boundary portions of the exterior circumference of the inner ring 200 and the interior circumference of the wheel hub 100 contacting with each other may be welded such that preload applied to the wheel bearing can be maintained.

Figure 11:
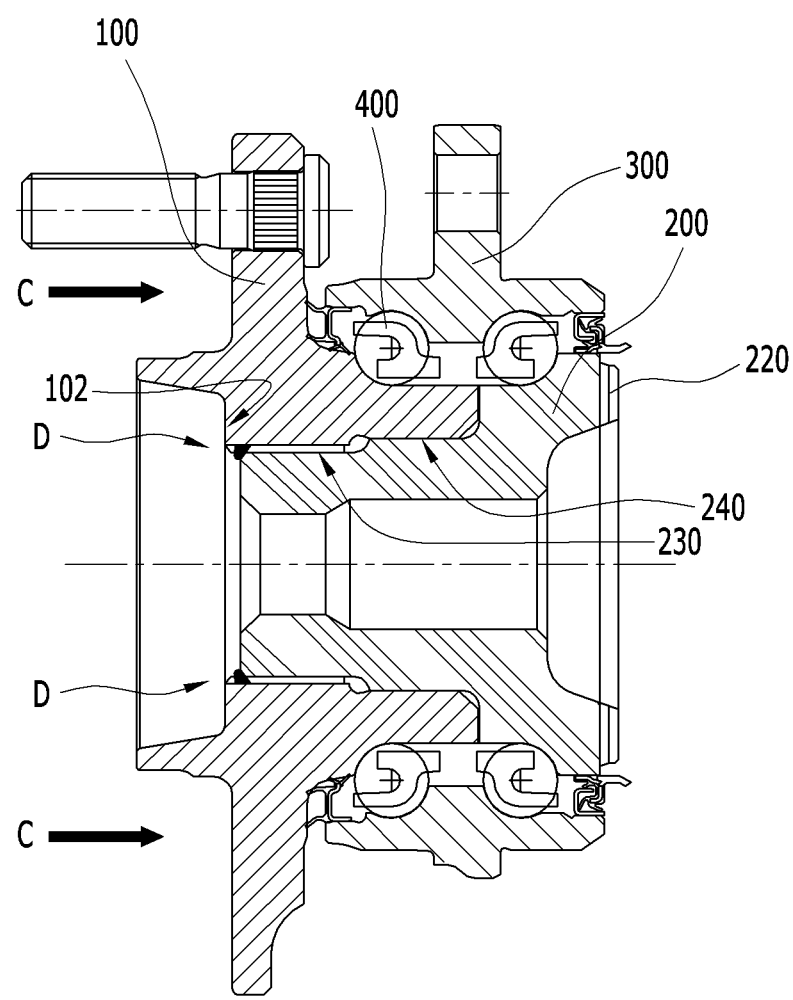
FIG. 11 is a cross-sectional view of a structure for coupling a wheel bearing where an inner ring and a wheel hub in FIG. 8 are welded.

In one or more exemplary embodiments, as shown in FIG. 11, in a state that the wheel hub 100 is pressed in C direction, the boundary portions D of the wheel hub 100 and the inner ring 200 may be welded circumferentially. Thereby, the preload applied to the wheel hub 100 can be maintained. In addition, the bolt 700 penetrates the wheel hub 100 and the inner ring 200 and engages with the engaging groove 620 of the joint member 600. Thereby, the wheel hub 100, the inner ring 200 and the joint member 600 can be coupled strongly.

As shown in FIG. 8, a radius of a head 710 of the bolt 700 is larger than that of the hollow space of the wheel hub 100 such that the bolt 700 is supported by the end portion 102 of the wheel hub 100.

Figure 13:
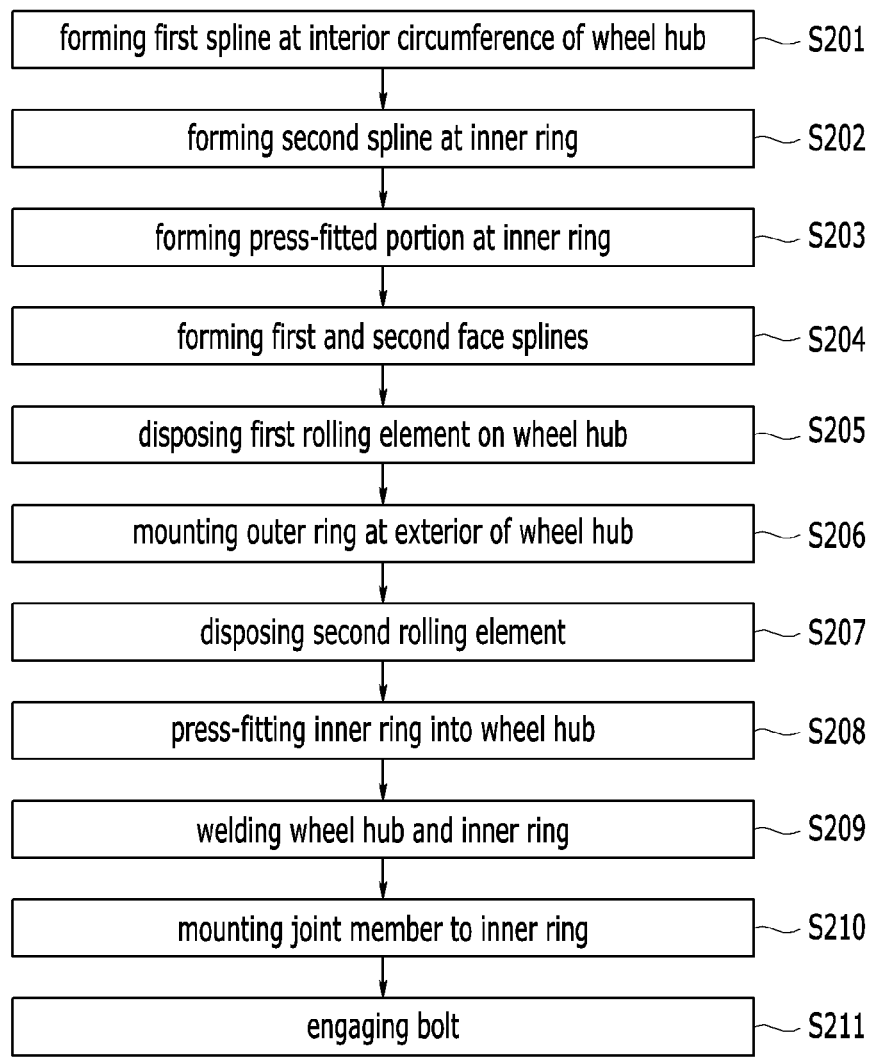
FIG. 13 is a flowchart of a method for coupling a wheel bearing according to the second exemplary embodiment of the present invention.

FIG. 13 is a flowchart of a method for coupling a wheel bearing according to the second exemplary embodiment of the present invention.

Referring to FIG. 8 to FIG. 11 and FIG. 13, a method for coupling a wheel bearing according to the first exemplary embodiment of the present invention will hereinafter be described. Steps shown in FIG. 13 are for better comprehension and ease of description and scope of the present invention is not limited to the sequence of the steps shown in FIG. 13.

The first spline 110 is formed at a part of the interior circumference of the wheel hub 100 at step S201.

The inner ring 200 is formed to penetrate the interior circumference of the wheel hub 100, wherein the second spline 230 splined to the first spline 110 of the wheel hub 100 is formed at a part of the exterior circumference of the inner ring 200 at step S202.

As shown in FIG. 8, a part of the inner ring 200 penetrates through the hollow space of the wheel hub 100, and some portion of the exterior circumference of the part is formed of the second spline 230 so as to be splined to the first spline 110 of the wheel hub 100.

In addition, the other portion of the exterior circumference of the inner ring 200 penetrating through the wheel hub 100 other than the second spline 230 is formed of the press-fitted portion 240 at step S203.

FIG. 8 shows the second spline 230 of the inner ring 200 is formed closed to the flange 101 and the press-fitted portion 240 is formed close to the outer ring 300, but FIG. 9, contrary to FIG. 8, shows the press-fitted portion 240 of the inner ring 200 is formed close to the flange 101 and the second spline 230 is formed close to the outer ring 300.

The first facial spline 220 is formed radially at the end surface of the inner ring 200 and the second facial spline 610 engaging with the first facial spline 220 is formed at the joint member 600 at step S204.

As shown in FIG. 9 or FIG. 10, the first facial spline 220 is formed at the end surface of the inner ring 200 along a circumferential direction. The second facial spline 610 engaging with the first facial spline 220 is formed at a surface of the joint member 600 contacting with the inner ring 200.

After that, the first rolling element 410 is disposed on the exterior circumference of the wheel hub 100 at step S205.

As shown in FIG. 8, first rolling element 410 is mounted between the exterior circumference of the wheel hub 100 and the interior circumference of the end portion of the outer ring 300 so as to smoothen relative rotation of the wheel hub 100 and the outer ring 300. In addition, the first sealing member 411 may be disposed between the exterior circumference of the wheel hub 100 and the exterior circumference of the end portion of the outer ring 300 before the first rolling element 410 is disposed. The first sealing member 411 may be a ring-shaped seal.

After that, as shown in FIG. 8, the outer ring 300 is mounted to contact with an exterior circumference of the first rolling element 410 at step S206.

After that, the second rolling element 420 is disposed to contact the interior circumference of the other end portion of the outer ring at step S207 in a state that the outer ring 300 is mounted.

After that, the inner ring 200 is press-fitted and mounted into the wheel hub 100 at step S208.

At this time, as shown in FIG. 8 or FIG. 9, the second spline 230 of the inner ring 200 is splined to the first spline 110 of the wheel hub 100 and the press-fitted portion 240 of the inner ring 200 is press-fitted into the interior circumference of the wheel hub 100.

In one or more exemplary embodiments, the diameter of the interior circumference of the wheel hub 100 is smaller than that of the exterior circumference of the press-fitted portion 240, and the inner ring 200 may be press-fitted into the wheel hub 100 by the hydraulic press.

In one or more exemplary embodiments, the raised spot (not shown) may be formed at the interior circumference of the wheel hub 100 the wheel hub 100 and the protrusion (not shown) caught by the raised spot may be formed at the exterior circumference of the press-fitted portion 240 of the inner ring 200. After that, the inner ring 200 may be press-fitted into the wheel hub 100.

In a state that the inner ring 200 is press-fitted, as shown in FIG. 8, the second sealing member 421 may be disposed between the exterior circumference of the inner ring 200 and the interior circumference of the other end portion of the outer ring 300. The second sealing member 421 may be a ring-shaped seal.

After that, in a state that the wheel hub 100 is pressed onto the inner ring 200, the boundary portions of the exterior circumference of the other end portion of the inner ring 200 and the interior circumference of the wheel hub 100 may be welded at step S209.

As shown in FIG. 11, since the wheel hub 100 is pressed in the C direction and the boundary portions D of the wheel hub 100 and the inner ring 200 are welded in the circumferential direction, the preload applied to the wheel hub 100 can be maintained.

After that, the joint member 600 provided with the second facial spline 610 engaging with the first facial spline 220 of the inner ring 200 is mounted at the inner ring 200 at step S210.

As shown in FIG. 8 or FIG. 9, since power delivery from the joint member 600 to the inner ring 200 may be assisted by the first facial spline 220 and the second facial spline 610 engaging with each other, stable power delivery may be achieved and noise occurring during power delivery may be reduced.

Lastly, the bolt 700 penetrates through the hollow space of the inner ring 300 and engaged with the engaging groove 620 of the joint member 600 at step S211.

As shown in FIG. 8, since the hollow space of the inner ring 300 engages with the engaging groove 620 of the joint member in a state that the joint member and the inner ring 200 are coupled, the wheel hub 100, the inner ring 200 and the joint member can be coupled strongly.

Since the driving torque is delivered through the first and second facial splines 220 and 610 of the inner ring 200 and the joint member 600 and is then delivered from the inner ring 200 to the wheel hub 100 through the first and second splines 110 and 230 according to the second exemplary embodiment of the present invention, the driving torque can be delivered stably. In addition, since the inner ring 200 is mounted to maintain the preload applied to the wheel bearing through the press-fitted portion 240 and welding, the driving torque can be delivered further stably and noise occurring when power delivery may be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A structure for coupling a wheel bearing comprising:
   a wheel hub formed of a flange for mounting a vehicle wheel;
   a hollow inner ring press-fitted onto an end portion of the wheel hub;
   an annular outer ring disposed at an outside of the wheel hub and the inner ring;
   at least one rolling elements disposed between the wheel hub or the inner ring and the outer ring; and
   a hollow pin splined to an interior circumference of the wheel hub and an interior circumference of the inner ring.

2. The structure of claim 1, wherein a first spline is formed at the interior circumference of the wheel hub, a second spline is formed at an exterior circumference of the hollow pin, and a third spline is formed at the interior circumference of the inner ring, and
   wherein the second spline is splined simultaneously with the first spline and the third spline.

3. The structure of claim 1, wherein a first facial spline is formed radially at an end surface of the inner ring, and wherein the structure further comprises a joint member formed of a second facial spline engaged with the first facial spline; and a bolt penetrating through the hollow pin and coupling the joint member with the wheel hub.

4. The structure of claim 1, wherein an end of the hollow pin is bent radially outwardly so as to form a supporting portion.

5. The structure of claim 4, wherein the other end of the hollow pin is bent radially outwardly so as to form a bending portion.

6. The structure of claim 5, wherein the bending portion is formed by orbital forming process.

7. The structure of claim 1, wherein the end portion of the wheel hub has an interior circumference stepped radially outwardly so as to form a stepped portion, and the inner ring is formed of a press-fitted portion protruded in an axial direction so as to be press-fitted into the stepped portion.

8. The structure of claim 7, wherein a diameter of an interior circumference of the stepped portion is smaller than that of an exterior circumference of the press-fitted portion.

9. A structure for coupling a wheel bearing comprising:
a wheel hub formed of a flange for mounting a vehicle wheel;
a hollow inner ring penetrating through and press-fitted into an interior circumference of the wheel hub;
an annular outer ring disposed at an outside of the wheel hub and the inner ring; and
at least one rolling element disposed between the wheel hub or the inner ring and the outer ring,
wherein a part of the inner ring penetrating through the wheel hub is splined to an interior circumference of the wheel hub,
wherein a first facial spline is formed radially at an end surface of the inner ring, and
wherein the structure further comprises a joint member formed of a second facial spline engaged with the first facial spline; and
a bolt penetrating through the inner ring and coupling the joint member with the wheel hub.

10. The structure of claim 9, wherein a first spline is formed at an interior circumference of the wheel hub, a second spline splined to the first spline is formed at a part of the inner ring, a press-fitted portion protruded in an axial direction so as to be press-fitted into the wheel hub is formed at other portion than the second spline of the inner ring.

11. The structure of claim 9, wherein a boundary portion where an exterior circumference of the inner ring and the interior circumference of the wheel hub contacts with each other is welded such that preload applied to the wheel hub is maintained.

12. A method for coupling a wheel bearing comprising:
forming a stepped portion stepped radially outwardly at an interior circumference of an end portion of a hollow wheel hub having a flange for mounting a vehicle wheel;
forming a press-fitted portion at an inner ring, the press-fitted portion being protruded in an axial direction so as to be press-fitted into the stepped portion;
forming a first spline at an interior circumference of the wheel hub, forming a second spline at an exterior circumference of a hollow pin inserted into the wheel hub and the inner ring, and forming a third spline at an interior circumference of the inner ring;
coupling the inner ring to the wheel hub by press-fitting the press-fitted portion into the stepped portion; and
inserting the hollow pin into the wheel hub and the inner ring so as for the second spline to be splined to the first spline and the third spline simultaneously.

13. The method of claim 12, further comprising:
forming a first facial spline radially at an end surface of the inner ring and forming a second facial spline engaging with the first facial spline at a joint member;
mounting the joint member to the inner ring so as to engage the first facial spline and the second facial spline; and
inserting a bolt into the hollow pin and coupling the bolt to an engaging groove of the joint member.

14. A method for coupling a wheel bearing comprising:
forming a first spline at a part of an interior circumference of a hollow wheel hub having a flange for mounting a vehicle wheel;
forming an inner ring to penetrate through the wheel hub, wherein a second spline splined to the first spline is formed at a part of the inner ring;
forming a press-fitted portion at other part of the inner ring, the press-fitted portion being protruded in an axial direction so as to be press-fitted into the wheel hub; and
assembling the inner ring and the wheel hub by press-fitting the press-fitted portion into the wheel hub and splining the first spline with the second spline.

15. The method of claim 14, further comprising:
forming a first facial spline radially at an end surface of the inner ring and forming a second facial spline engaging with the first facial spline at a joint member;
mounting the joint member to the inner ring so as to engage the first facial spline and the second facial spline; and
inserting a bolt into a hollow space of the inner ring and coupling the bolt to an engaging groove of the joint member.

* * * * *